(12) United States Patent
Harriman

(10) Patent No.: US 9,564,801 B1
(45) Date of Patent: Feb. 7, 2017

(54) INDUCTIVE-ENERGY-BASED AUTO-TUNING DC-TO-DC CONTROLLER

(71) Applicant: SEMICONDUCTOR COMPONENTS INDUSTRIES, LLC, Phoenix, AZ (US)

(72) Inventor: Paul J. Harriman, Belfair, WA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 31 days.

(21) Appl. No.: 14/808,708

(22) Filed: Jul. 24, 2015

(51) Int. Cl.
*H02M 3/157* (2006.01)
*H02M 3/04* (2006.01)

(52) U.S. Cl.
CPC ..................... *H02M 3/04* (2013.01)

(58) Field of Classification Search
CPC .............................. H02M 3/156; H02M 3/157
USPC .................... 323/282, 283, 284, 285, 286
See application file for complete search history.

(56) References Cited

U.S. PATENT DOCUMENTS

| | | | | |
|---|---|---|---|---|
| 5,481,178 A * | 1/1996 | Wilcox | ................. | H02M 3/156 323/224 |
| 5,600,234 A * | 2/1997 | Hastings | ................. | G05F 1/575 323/282 |
| 7,737,668 B2 * | 6/2010 | Oswald | ............... | H02M 3/1582 323/259 |
| 2007/0170902 A1 * | 7/2007 | Chen | ...................... | H02M 3/156 323/282 |
| 2010/0109713 A1 * | 5/2010 | Harriman | ............ | H02M 3/1584 327/103 |
| 2012/0181999 A1 * | 7/2012 | Weng | ...................... | H02M 1/08 323/282 |
| 2013/0141058 A1 * | 6/2013 | Kris | ........................ | H02M 3/157 323/271 |
| 2013/0307508 A1 * | 11/2013 | Hallak | ................ | H02M 3/1582 323/282 |
| 2015/0076902 A1 * | 3/2015 | Zou | ......................... | H02J 7/022 307/23 |
| 2015/0280544 A1 * | 10/2015 | Wang | ...................... | H02M 1/32 323/285 |
| 2015/0364995 A1 * | 12/2015 | Chen | ...................... | H02M 3/158 323/271 |
| 2016/0315536 A1 * | 10/2016 | Harriman | ............. | G01R 19/0092 |

\* cited by examiner

*Primary Examiner* — Jeffrey Sterrett
(74) *Attorney, Agent, or Firm* — Iselin Law, PLLC

(57) ABSTRACT

A method for controlling a pulse-modulated DC-to-DC converter includes: applying a control signal to a driver of an LC filter, the driver coupling power to inputs of the LC filter when the control signal is asserted and decoupling power when the control signal is de-asserted; monitoring an inductor current and an output voltage of the LC filter; calculating a goal current based at least in part on inductor energy needed to recharge an output capacitor in the LC filter; asserting the control signal when the goal current exceeds a threshold; and de-asserting the control signal when the inductor current reaches the goal current. An illustrative controller embodiment produces a trigger signal that sets a flip flop when the goal current exceeds the inductor current by more than a threshold amount; and resets the flip flop when the inductor current exceeds the goal current.

20 Claims, 3 Drawing Sheets

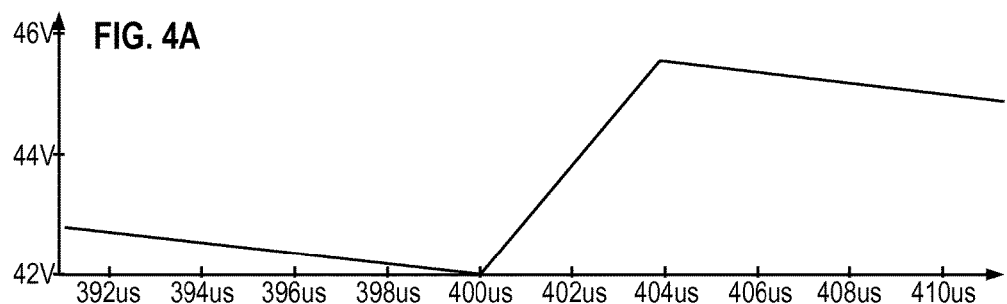
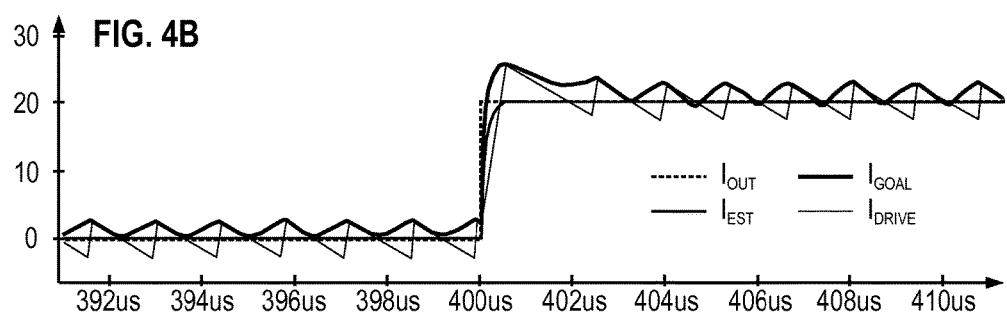
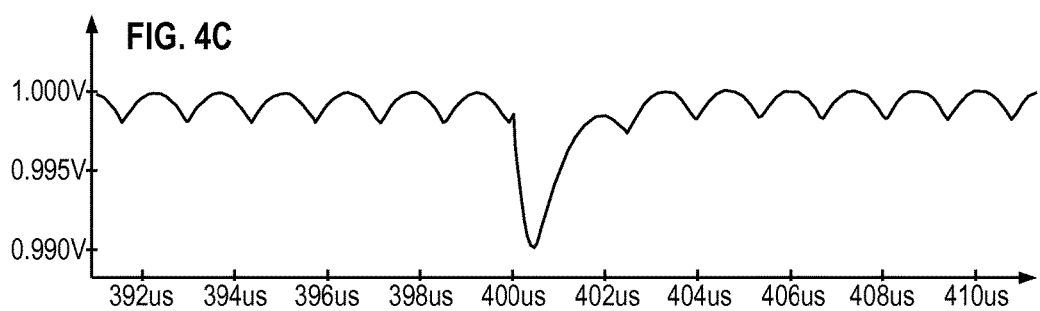

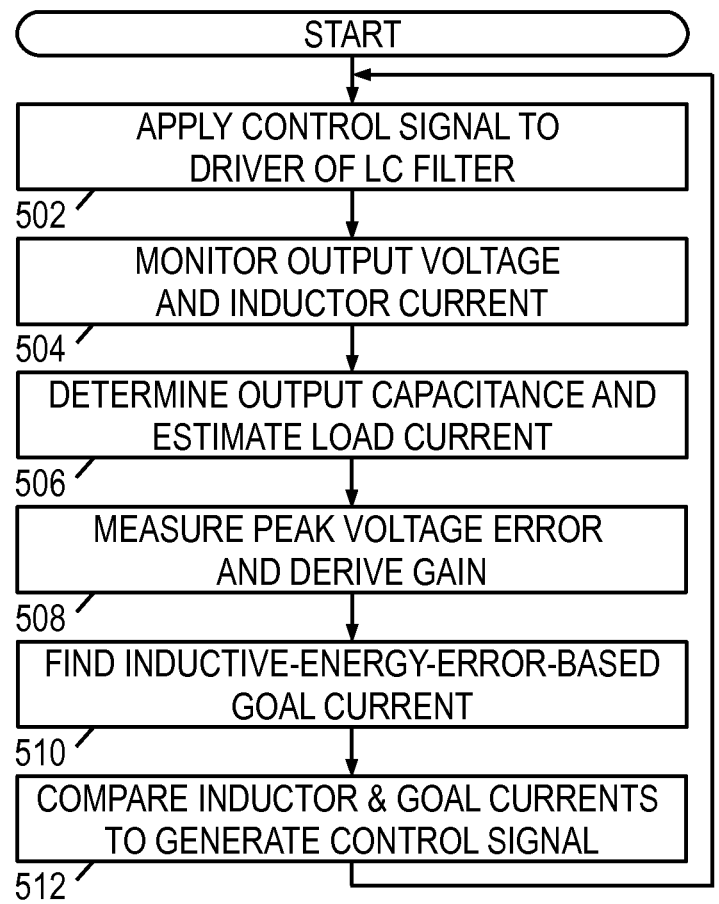

INDUCTIVE-ENERGY-BASED AUTO-TUNING DC-TO-DC CONTROLLER

BACKGROUND

Switched-mode power supplies have been in widespread use for several decades. An important component of such power supplies is the DC-to-DC converter. These converters accept power as a first direct current (DC) voltage (typically unregulated) and provide power for use by one or more electronic devices at a second, regulated DC voltage. The input DC supply is converted into a series of pulses with operating frequencies in the tens or hundreds of kilohertz. Regulation is typically achieved by varying the width and/or duty cycle of the individual pulses. A switching device amplifies and feeds the pulse train into a low-pass filter at the output of the converter, thus providing a regulated DC voltage at the output of the filter.

The control signal used to vary the pulse width is generally an error signal derived from the difference between the output DC voltage and a precision reference voltage. Identifying how to generate such a control signal with a compensator circuit involves a number of difficult design problems. Both the filter present at the converter output and the load present at the filter output are generally complex loads that behave non-linearly. Attempting to regulate the voltage of the converter output linearly with a simple difference signal can result in a filter output voltage that overshoots and/or undershoots the target regulation point, and may further have an unacceptable ripple component. A type II compensator can provide a stable, non-linear control signal, but in such designs it is important to match the behavior of the compensator to the filter present at the output of the converter to achieve accurate DC voltage regulation. This may not always be possible, particularly where the DC-to-DC converter is implemented as a single, general-purpose integrated circuit with unknown external filter components. Further, load current sensing rather than voltage sensing may be required by such compensators, and such current sensing may not always be available or practical.

BRIEF DESCRIPTION OF THE DRAWINGS

A better understanding of the various disclosed embodiments can be obtained when the following detailed description is considered in conjunction with the attached drawings, in which:

FIG. 4A is a graph of an estimated gain signal versus time.

FIG. 4B shows graphs of actual, estimated, and goal current signals versus time.

FIG. 4C is a graph of regulated output voltage under a step current condition.

FIG. 5 is a flow diagram of an illustrative inductive energy based control method.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1:
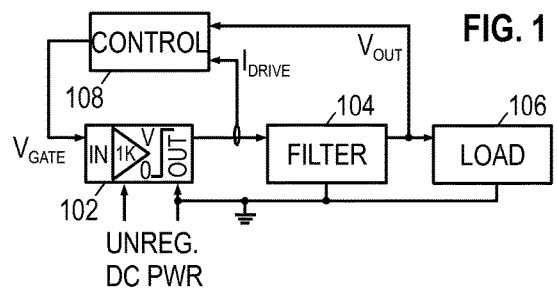
FIG. 1 is a schematic of an illustrative switched-mode power supply.

The disclosed techniques are best understood in context. Accordingly, FIG. 1 shows an illustrative DC-to-DC converter, which supplies a control signal ($V_{GATE}$) to a driver 102. When asserted, the control signal causes the driver 102 to couple the unregulated DC input power to the input of a filter 104. De-assertion of the control signal causes the driver to couple the drive terminal to ground, thereby decoupling the input power from the filter input. The control signal is a frequency modulated (FM) or pulse-width modulated (PWM) pulse train that couples sufficient power to the filter to provide a regulated voltage signal ($V_{OUT}$) at the output of filter 104. Typical pulse frequencies are in the tens or hundreds of kilohertz to provide tight voltage regulation.

The output of the filter 104 is coupled to a load 106, which is assumed to operate in an unpredictable manner (within the established load specifications). Thus, for example, the load 106 may impose step-changes in load current without warning. To maintain regulation of the output voltage, the converter includes a controller 108 that senses the output voltage signal $V_{OUT}$ and a signal representing the driver current ($I_{DRIVE}$) and uses them for adaptive feedback when generating the control signal $V_{GATE}$.

Figure 2:
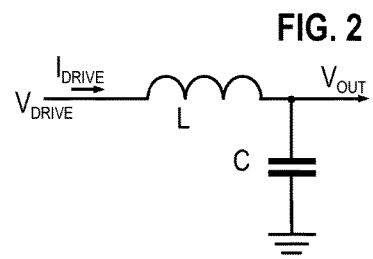
FIG. 2 is a schematic of an illustrative external LC filter.

Certain types of output filter 104 create non-linearities that make it difficult to provide optimum performance with unknown values for the filter components. As an example, FIG. 2 shows an LC low pass filter 104. The series inductor (L) creates difficulties in regulating the output voltage because of its energy storage, which causes current to continue flowing even after the driver 102 has coupled the input terminal to ground. At least some of the controller embodiments disclosed herein incorporate auto-tuning to account for the inductor's stored energy when regulating $V_{OUT}$, doing so in a predictive fashion.

Figure 3A:
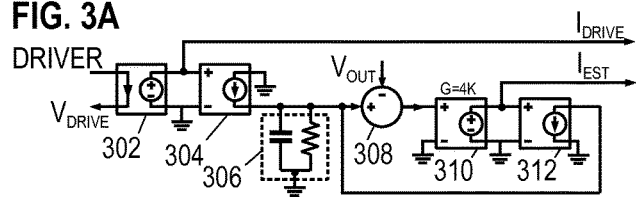
FIG. 3A is a schematic of an illustrative load current estimator.
Figure 3B:
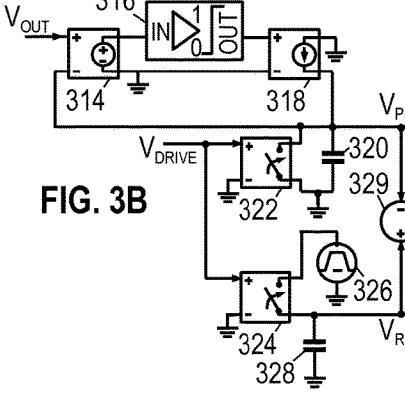
FIG. 3B is a schematic of an illustrative gain estimator.
Figure 3C:
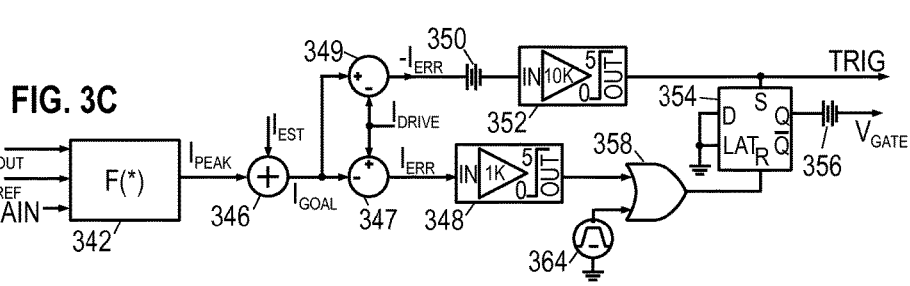
FIG. 3C is a schematic of an inductive-energy-based controller.

The illustrative controller circuit shown in FIGS. 3A-3C provides a predictive, self-tuning, continuous or discontinuous, regulated DC-DC buck converter, using a non-linear gain energy based transfer function to control the peak energy stored in the inductor on every switching cycle such that the capacitor voltage is fully recovered on every cycle. The proper feedback loop gain is derived from the peak output voltage achieved on each cycle. Moreover, the illustrative circuit triggers the switching cycles based on the energy stored in the output capacitor.

Before describing the precise operation of the illustrative circuit, it is helpful to understand certain underlying principles.

Some contemplated embodiments of the controller directly measure the load current, but this approach may require a series impedance between the output capacitor and the load, which increases the effective impedance of the output filter and dissipates power. To avoid this, other contemplated embodiments estimate the load current ($I_{EST}$) from the available signals. One approach uses an internal circuit model with a small capacitance that represents the output capacitor and a current source controlled by an error amplifier to drive the capacitance to the measured output voltage, thereby simulating the load current. The resulting estimate can be obtained much more rapidly than a calculation based on the average inductor current. (A scale factor may be needed to account for the difference between the internal estimator and the output capacitor. Options for determining this scale factor are described further below.)

For given component values of the LC circuit, it can be determined in advance how much energy is needed to recharge the output capacitor of capacitance C from the present output voltage $V_{OUT}$ to the desired output voltage $V_{REF}$, namely:

$$E_{recharge} = \tfrac{1}{2} C(V_{ref}^2 - V_{out}^2)$$

The energy in the inductor of inductance L is related to its current I:

$$E_{inductor} = \tfrac{1}{2} L I^2$$

And thus by equating the two, the desired recharge current for recharging the capacitor can be readily calculated as:

$$I_{recharge} = \pm \sqrt{\frac{C}{L}} \sqrt{|V_{ref}^2 - V_{out}^2|}$$

The two solutions (positive and negative) correspond to when $V_{OUT}$ is below or above $V_{REF}$. Note that the foregoing analysis fails to account for the load current. This omission can be addressed by adding an estimated load current $I_{EST}$ to get the goal current $I_{GOAL}$:

$$I_{goal} = I_{est} + I_{recharge} = I_{est} \pm \sqrt{\frac{C}{L}} \sqrt{|V_{ref}^2 - V_{out}^2|}$$

To determine whether the recharge current should be calculated as positive or negative, a comparison of $V_{REF}$ and $V_{OUT}$ is performed. Where $V_{REF}$ is greater than $V_{OUT}$, the plus sign is used. Where $V_{REF}$ is less than $V_{OUT}$, the negative sign is used.

Thus, the illustrative circuit is designed to monitor the voltage on the capacitor and use it to calculate the recharge current needed each cycle to determine the amount of energy that should be stored in the inductor to reach the desired peak output voltage each cycle. It can be seen that this gain is not a linear function of $V_{OUT}$, but the root of the ratio between the capacitance and inductance can be thought of as the gain:

$$\text{Gain} = \sqrt{\frac{C}{L}}$$

Once the load current is estimated and the gain parameter is determined, the controller can regulate $V_{OUT}$, driving the capacitor to the desired output voltage on each cycle, thereby providing the fastest response that can be achieved without overshooting the desired voltage. In other words, the system is critically damped once these parameters are determined.

Accordingly, the controller circuit of FIGS. 3A-3C operates to self-tune its estimate of the optimal gain based on the output voltage feedback. Moreover, this operation is achieved without complex digital signal processing to solve for the optimal compensation. Rather, the gain is estimated by measuring the difference between $V_{REF}$ and the peak output voltage achieved on each cycle. If there is an overshoot, the gain is above optimal, and conversely if there is an undershoot the gain is too low. Based on this observation, the circuit operates to adjust the gain based on the peak voltage error in each cycle. In practice, a filter is included to reduce the effects of load noise or transients during regulation.

If the inductor size L were known, the estimated gain value can be used to estimate the size of the output capacitor C:

$$C = \text{Gain}^2 \cdot L$$

Fortunately, the inductor size can be measured as the voltage across the inductor divided by the time derivative of the current through the inductor:

$$L = \frac{V_{DRIVE} - V_{OUT}}{\frac{d}{dt} I_{DRIVE}(t)}$$

To enable the system to accurately determine the gain, the controller may initiate operation by applying only small amounts of energy to the inductor, e.g., using a $V_{REF}$ of 1 mV. Alternatively, the estimated load current $I_{EST}$ may be initially maintained at zero until the controller has had adequate time to determine an approximation of the gain of sufficient accuracy to yield a useful approximation of C.

Another option for determining the size of the output capacitor is to apply a test current to the filter before initiating voltage regulation (thereby obtaining load impedance) and isolating the inductor input to observe the output voltage decay (thereby obtaining C). Still another option is to have an external reference capacitor attached to an extra pin on the controller to serve as a scaled version of the output capacitor (e.g., C/10). The controller then uses the reference capacitor as the internal representative of the output capacitance when estimating load current.

Another design principle concerns the manner in which the switching cycle is triggered. There are a number of ways to trigger PWM of the control signal $V_{GATE}$. The trigger may be clock-based, output voltage (ripple) based, inductor current based, or some combination of these. To make the transient response as fast as possible and take advantage of the natural behavior of the LC filter for PWM stability, it is desirable to include the output voltage feedback in the trigger function of the PWM signal, which also accounting for the inductor current. The approach taken by the controller circuit of FIGS. 3A-3C is to trigger based on the inductive energy error.

That is, when the output voltage begins dropping, the desired recharge current $I_{RECHARGE}$ (and hence the goal current $I_{GOAL}$) begins rising. When the goal current reaches a threshold current value, the circuit triggers a pulse in the control signal $V_{GATE}$, causing driver 102 to supply power to the filter inputs. The pulse continues until the drive current $I_{DRIVE}$ reaches the goal current $I_{GOAL}$. When the circuit detects that the desired recharge current has been reached, the control signal causes the driver 102 to decouple power from the input filter. Note that while the control signal is asserted and driver 102 is supplying power, the output voltage $V_{OUT}$ and inductor current $I_{DRIVE}$ continues to change, but so long as the goal current $I_{GOAL}$ is calculated continuously the correct termination current will be achieved.

In this way, the controller can control the ripple current in the inductor and the output voltage together and create a very fast transient response and a stable operating frequency under steady-state load, even if the buck converter is operating in a discontinuous mode due to light loading or operating in a continuous mode under heavy load. One PWM cycle is sufficient to recover from a transient load. The disclosed approach avoids undershoot after load release and does not suffer from integrator windup. Conversely, if the reference voltage changes, the system will not overshoot, regardless of whether slewing is used to make the change in reference voltage. The controller drives the output voltage to the target as fast as possible given the constraints of the output filter.

Moreover, the switching frequency of the controller can be adaptively controlled and stabilized against changing load conditions by measuring the operating frequency and adjusting the threshold current upward (to reduce frequency) or downward (to increase frequency). Due to this ability to frequency scale while maintaining high-performance transient response, this configuration is readily adapted for use with various power saving techniques.

Among the potential benefits of this approach is an inherent rejection to changes in input voltage. The loop gain is not a function of input voltage; the pulse width changes as needed to provide sufficient time for the inductor to reach the recharge current. If desired, the system can compensate by adjusting the threshold current value used for triggering the switching pulses.

In view of the foregoing principles, the illustrative controller circuit of FIGS. 3A-3C is now described in detail. Unless otherwise specified, the gain of the various amplifiers is set at unity. FIG. 3A shows an illustrative load-estimation subcircuit, FIG. 3B shows an illustrative gain estimation subcircuit based on measured error in peak voltage, and FIG. 3C shows an illustrative control signal generation subcircuit based on inductive energy.

The subcircuit of FIG. 3A operates to measure the drive current $I_{DRIVE}$ and to estimate the load current $I_{EST}$. A transimpedance amplifier, hereafter referred to as a current-controlled voltage source (CCVS) 302, produces a voltage signal $I_{DRIVE}$ representing the amount of current flowing from driver 102 to filter 104. A transconductance amplifier, hereafter referred to as a voltage controlled current source (VCCS) 304, supplies the corresponding amount of current to an integrator 306 that represents a scaled version of the output capacitor. For the simulation described below, the integrator 306 has a capacitance of 125 nanofarads (¼₀₀₀ of the output capacitor size, which is set at 500 microfarads) in parallel with a resistance of 1 megaohm.

A differencing node 308 subtracts the sensed output voltage $V_{OUT}$ from the output voltage of the integrator 306, producing an error voltage. An operational amplifier, configured here as a voltage controlled voltage source (VCVS) 310 with an amplifier gain of 4000, converts the error voltage into a voltage signal representing the estimated load current $I_{EST}$. A VCCS 312 draws the corresponding amount of current from the integrator 306. This feedback configuration ensures that the load current is properly estimated, so that the voltage of integrator 306 mimics the sensed output voltage $V_{OUT}$.

The subcircuit of FIG. 3B operates to estimate the gain factor ($\sqrt{C/L}$, or GAIN) for calculating desired recharge inductor current from the output voltage error. A VCVS 314 measures the difference between the sensed output voltage $V_{OUT}$ and a previous determination of output capacitor's peak voltage ($V_{PEAK}$) which has been stored on an accumulating capacitor 320 and provides it as a difference signal. A limiter 316 passes the difference signal so long as it is between zero and one volt. If the difference signal is below zero, the limiter 316 outputs zero volts. If the difference signal is above one volt, the limiter 316 outputs one volt. A VCCS 318 converts the limited difference signal into a current to raise the determination of $V_{PEAK}$ when $V_{OUT}$ is above $V_{PEAK}$. In this manner, the voltage on capacitor 320 follows $V_{OUT}$ until it peaks, then remains there as $V_{OUT}$ falls.

A voltage-controlled switch (VCSw) 322 closes whenever the drive voltage ($V_{DRIVE}$) is asserted, shorting out capacitor 320 and resetting $V_{PEAK}$ to zero while the inductor current is being increased. Each time the drive voltage drops back to zero, VCSw 322 re-opens, enabling $V_{PEAK}$ to be re-determined.

A second VCSw 324 also closes when the drive voltage is asserted, coupling a reference voltage source 326 to a sample-and-hold capacitor 328. Each time the drive voltage drops back to zero, VCSw 324 opens, preventing changes to the reference voltage $V_{REF}$ on capacitor 328. The reference voltage source 326 is shown as providing a time-variant waveform for simulation purposes, but in practice would likely provide a fixed voltage after an optional brief delay for internal supply voltages to stabilize.

A differencing node 329 subtracts the peak voltage $V_{PEAK}$ from the reference voltage $V_{REF}$ to obtain an undershoot error signal. An amplifying limiter 330 with a gain of 10 k produces an asserted 5V logic signal if the undershoot error is positive by at least 0.25 mV, otherwise producing a de-asserted logic signal. Assertion of a trigger signal (TRIG) causes a D-type flip flop 332 to latch the logic signal, indicating whether an undershoot was detected on the previous cycle. (As explained below, the trigger signal initiates a new pulse in the control signal $V_{DRIVE}$).

A level shifter 334 lowers the voltage of the undershoot indication by 2.5 volts (so that when de-asserted, it is −2.5 volts, and when asserted it is +2.5 volts). Another amplifying limiter 336 with a gain of 500 supplies a gain adjustment signal that is 5 volts when the undershoot indicator is asserted and zero when the undershoot indicator is de-asserted. A low pass filter 338 filters the gain adjustment signal to provide the GAIN signal. Each assertion of the undershoot indicator increases the GAIN signal, while each de-assertion of the undershoot indicator decreases the GAIN signal by the same amount. The simulation employs a resistance of 50 kΩ and a capacitance of 10 nF. An initial estimated gain source 340 is shown as providing a time variant waveform for simulation purposes, but in practice would likely provide a fixed voltage after an optional brief delay for internal supply voltages to stabilize.

The subcircuit of FIG. 3C operates on the measured drive current $I_{DRIVE}$, measured output voltage $V_{OUT}$, the reference voltage $V_{REF}$, the estimated gain GAIN and the estimated load current $I_{EST}$ to produce the control signal $V_{GATE}$ for switching the driver 102. A function module 342 produces a voltage signal representing the desired recharge current $I_{RECHARGE}$ for recharging the output capacitor:

$$I_{peak} = \begin{cases} \text{Gain} \cdot \sqrt{V_{ref}^2 - V_{out}^2} & \text{for } V_{ref} \geq V_{out} \\ -\text{Gain} \cdot \sqrt{V_{out}^2 - V_{ref}^2} & \text{for } V_{ref} \geq V_{out} \end{cases}$$

Various analog multipliers, inverters, square root amplifiers, and decision circuit configurations are available in the literature, as well as digital signal processors that digitize, transform, and convert signals back to analog in a programmable fashion. Any suitable implementation for this function module may be used.

A summation node 346 adds the estimated load current $I_{EST}$ (from the subcircuit of FIG. 3A) to the desired recharge current, thereby producing a voltage signal representing the goal current $I_{GOAL}$. A differencing node 347 subtracts the goal current from the measured drive current $I_{DRIVE}$ (also from the subcircuit of FIG. 3A) to obtain an error current signal $I_{ERR}$. A limiting amplifier 348 with a gain of 1,000 provides a reset signal that is asserted at 5V when the error current signal exceeds 2.5 mV, and de-asserted when the error current is below that level.

A second differencing node 349 subtracts the drive current signal from the goal current signal to obtain the negative error current signal $I_{ERR}$. A level shifter 350 lowers the level of the negative error current signal by an adjustable threshold amount $I_{THRESH}$. When the drive current signal $I_{DRIVE}$ falls below the goal current signal $I_{GOAL}$ by more than the threshold amount, a second limiting amplifier 352 asserts the trigger signal (TRIG) at 5V, setting a flip flop 354. The asserted output of flip-flop 354 is applied to a level shifter 356 to lower the logic signal by 1 volt, producing a control signal $V_{GATE}$ that is 4 volts when asserted and −1 volt when de-asserted. This control signal $V_{GATE}$ is applied to driver 102 of FIG. 1. As a consequence, the drive current signal $I_{DRIVE}$ begins to rise and the goal current starts to fall, causing the trigger signal (TRIG) to become de-asserted. Once the drive current signal exceeds the goal current signal by 2.5 mV, limiting amplifier 348 asserts the reset signal, which is forwarded to flip flop 354 via logical OR gate 358. Assertion of the reset signal causes de-assertion of the control signal $V_{GATE}$, which causes the drive current signal to start falling and the goal current signal to start rising, so that the cycle repeats.

The other input of logical OR gate 358 is an inhibitor signal source 364, which is briefly asserted after power is turned on to inhibit assertion of the control signal until after the internal power supplies have stabilized.

FIGS. 4A-4C show the simulation results for the illustrative controller of FIGS. 3A-3C, including the response to a 20 ampere step change in load current at 400 microseconds after regulation begins. FIG. 4A is a graph of the estimated gain signal GAIN. The gain estimator uses a low pass filter, and at the illustrated time just before the change in load current, it has a value of about 42 and is still falling towards its "true" value of 40. As will be seen in FIG. 4C, the step change in current causes the output voltage to fall short of the reference voltage for two cycles spanning about four microseconds. The estimated gain accordingly rises during this interval until the output voltage has recovered, then begins re-converging on the true gain value.

FIG. 4B shows four curves. The broken-line shows the load current $I_{OUT}$ which undergoes a step change from 0 to 20 amps at 400 μs. The solid line representing the estimated load current $I_{EST}$ shows that the estimate tracks the load current accurately, converging to the new value within 0.5 μs. The thin solid line represents the measured drive current $I_{DRIVE}$, which rises quickly when the driver applies input power to the inductor and falls comparatively slowly when the filter inputs are grounded. The heavy solid line represents the goal current $I_{GOAL}$, which rises as the output voltage $V_{OUT}$ deviates from the reference voltage and falls as the output voltage converges to the reference voltage. As discussed previously, the pulses are triggered whenever the goal current exceeds the drive current by a predetermined threshold and terminated whenever the drive current reaches the goal current.

FIG. 4C shows the output voltage. The steady-state operation shows $V_{OUT}$ being maintained at 1 volt, with a bit of ripple. With a 20 amp step change in output current, output voltage falls to nearly 1% below the reference voltage, but recovers within two cycles spanning about 4 μs without any appreciable overshoot.

FIG. 5 is a flow diagram of an illustrative output voltage regulation method that may be implemented by the controller. In block 502, the controller applies a pulsed control signal to a driver 102, which alternately couples input power to an LC filter and grounds the LC filter inputs. When the controller is first powered-on, it may not have sufficient information regarding the LC filter configuration and load. Accordingly, the initial pulses may be made with "safe" assumptions regarding these parameters, i.e., values that minimize risk of output voltage overshoot. As one example, the reference voltage may be initially set at zero and gradually ramped to the desired value.

In block 504, the controller monitors the inductor current ($I_{DRIVE}$) and the output voltage ($V_{OUT}$). In block 506, the controller determines the output capacitance, either from a reference capacitor or using alternative methods described above. Using the output capacitance value, the controller estimates the load current ($I_{EST}$).

In block 508, the controller determines the peak output voltage during every cycle and compares it to the reference voltage to obtain the peak voltage error. The controller adaptively derives a gain value from the peak voltage error. Using this gain value in block 510, the controller monitors an inductive-energy-based error value, e.g. an inductor current goal value that would provide sufficient energy to re-charge the capacitor in a single cycle.

In block 512, the controller compares the sensed inductor current to the goal, initiating a new control signal pulse when the goal exceeds the inductor current by more than a threshold and terminating the pulse when the goal current has been reached. Blocks 502-512 are repeated to maintain the output voltage at the reference voltage level. Though the foregoing operations are shown as if they occur in a sequential order, in practice they may occur concurrently and in orders other than that shown.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method for controlling a pulse-modulated DC-to-DC converter, comprising:
    applying a control signal to a driver of an LC filter, the driver coupling power to inputs of the LC filter when the control signal is asserted and decoupling power when the control signal is de-asserted;
    monitoring an inductor current and an output voltage of the LC filter;
    calculating a goal current based at least in part on inductor energy needed to recharge an output capacitor in the LC filter;
    asserting the control signal when the goal current exceeds the inductor current by more than a threshold amount; and
    de-asserting the control signal when the inductor current reaches the goal current.

2. The method of claim 1, further comprising: estimating a load current, wherein the goal current includes the estimated load current.

3. The method of claim 2, wherein estimating a load current includes:
    determining capacitance of the output capacitor;

providing a supply current to a reference capacitor to follow the output voltage; and scaling the supply current to relate the reference capacitor to the capacitance of the output capacitor.

4. The method of claim 1, wherein said calculating a goal current includes deriving a gain from an error between a reference voltage and a peak voltage on the output capacitor.

5. The method of claim 1, wherein the goal current comprises a product of a gain with a square root of a difference between a squared reference voltage and a squared output voltage.

6. The method of claim 5, wherein the gain is a square root of a quotient of the LC filter's capacitance divided by the LC filter's inductance.

7. The method of claim 1, further comprising:
measuring a pulse frequency of the control signal; and
adjusting said threshold to maintain the pulse frequency at a predetermined value.

8. A pulse-modulated DC-to-DC converter controller that applies a control signal to a driver of an LC filter, the controller comprising:
a sensor that measures the inductor current; and
a pulse generator that asserts the control signal when the inductor current falls below a goal current by more than a threshold amount and that de-asserts the control signal when the inductor current reaches the goal current, wherein the pulse generator determines the goal current based at least in part on energy required by an inductor in the LC filter to recharge a capacitor in the LC filter to a reference voltage.

9. The controller of claim 8, further comprising:
a load current estimator that compares output voltage on the capacitor to a voltage on a reference capacitance and adapts a load current estimate to minimize an error between the output voltage and reference capacitor voltage,
wherein the goal current further comprises the load current estimate.

10. The controller of claim 9, further comprising:
a gain estimator that compares peak voltage on the capacitor to the reference voltage and adapts a gain to minimize an error between the peak and reference voltages.

11. The controller of claim 9, wherein the load current estimate is a scaled version of a follower current supplied to the reference capacitance, and wherein the controller determines a scale factor based at least in part on said gain determined by the gain estimator.

12. The controller of claim 11, wherein the scale factor is further based on an estimated inductance for said inductor in the LC filter.

13. The controller of claim 8, further comprising:
a gain estimator that compares peak voltage on the capacitor to the reference voltage and adapts a gain to minimize an error between the peak and reference voltages.

14. The controller of claim 8, wherein the goal current comprises a product of a gain with a square root of a difference between a squared reference voltage and a squared output voltage.

15. The controller of claim 8, further comprising:
a frequency controller that monitors a pulse frequency of the control signal and adjusts the threshold amount to maintain the pulse frequency at a predetermined value.

16. A pulse generator for a DC-DC converter controller, the pulse generator comprising:
an SR flip-flop that produces a control signal for a driver of an LC filter;
a differencing node that subtracts a measured inductor current from a goal current, producing a trigger signal that sets the SR flip flop when the goal current exceeds the inductor current by more than a threshold amount; and
a second differencing node that subtracts the goal current from the measured inductor current, producing a reset signal that resets the SR flip flop when the inductor current exceeds the goal current.

17. The pulse generator of claim 16, wherein the goal current comprises a recharge current, and wherein the pulse generator further comprises:
a function module that calculates a recharge current from a measured output voltage and a reference voltage.

18. The pulse generator of claim 16, wherein the recharge current is a product of an estimated gain with a square root of a difference between a square of the measured output voltage and a square of the reference voltage.

19. The pulse generator of claim 18, wherein the pulse generator inverts a sign of the recharge current depending on whether or not the measured output voltage is greater than the reference voltage.

20. The pulse generator of claim 18, further comprising a summation node that adds an estimated load current to the recharge current to produce the goal current.

* * * * *